May 20, 1930.  A. NICKERL  1,759,799
INCUBATOR
Filed Jan. 14, 1928
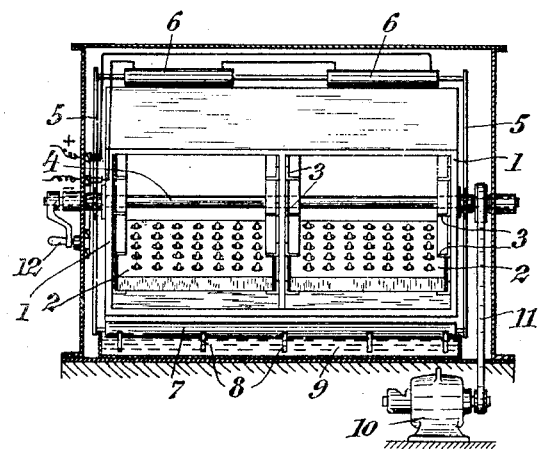
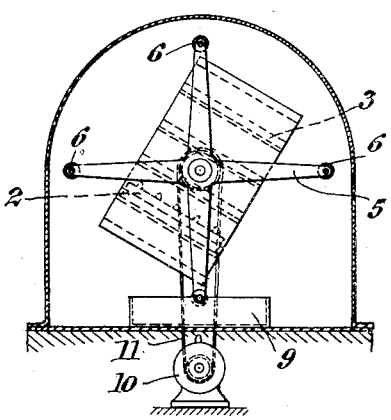
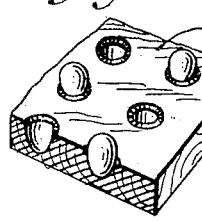
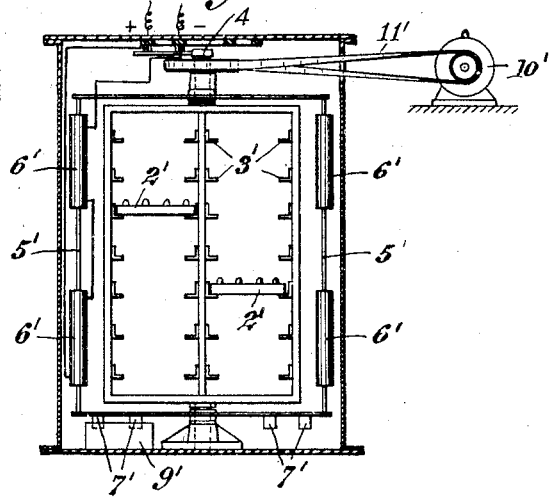
A. Nickerl
INVENTOR
By: Marks & Clerk
Attys.

Patented May 20, 1930

1,759,799

UNITED STATES PATENT OFFICE

ADOLF NICKERL, OF INZERSDORF, NEAR VIENNA, AUSTRIA

INCUBATOR

Application filed January 14, 1928, Serial No. 246,776, and in Austria September 14, 1926.

This invention relates to improvements in incubators or in apparatus employed for other purposes, particularly a warming chamber with a uniform distribution of the heat and an adjustable degree of moisture for breeding, incubating or rearing purposes.

The essential feature of the present invention consists in that the electric heating members are arranged to be rotatable around the incubator trays, so that the radiated heat operates on all sides of the eggs and the incubator chamber is uniformly heated by the moving heating members.

In order to control the degree of moisture within the incubator chamber, absorbing fabrics moving with the heating members around the incubator trays, are dipped into water to a greater or smaller extent during a part of their movement and the absorbed liquid is evaporated within the incubator chamber.

Two modes of carrying out the present invention are illustrated by way of example on the accompanying sheet of drawings in which:—

Figs. 1 and 2 show in side view and front view respectively an embodiment provided with a horizontally disposed axis of rotation.

Fig. 3 illustrates in side view an incubator provided with a vertically disposed axis of rotation.

Fig. 4 is an enlarged fragmentary sectional view of a portion of an egg tray showing the disposition of the eggs thereon.

The incubator trays 2, charged with eggs, are placed on suitable supporting bars 3 of the supporting frame 1, located in the incubator casing. A shaft 4, mounted in the walls of the incubator case, passes through the supporting frame 1 and a frame 5, which rotates round the incubator trays 2, is rotatable round the said shaft. In the construction shown in Figs. 1 and 2, the shaft 4 is disposed horizontally, while in the embodiment according to Fig. 3 the shaft 4' is arranged vertically. Electric heating members 6 are secured to the frame 5 and current is supplied in known manner by means of slip-rings and carbon brushes (not illustrated). Further strips 7 and 7' of an absorbing material are secured to the frame 5 and either directly (Fig. 3) or by means of flaps 8 (Fig. 1) dip into a trough 9 filled with water and absorb the latter, and on their way give up moisture to the air in the incubator case by means of evaporation.

The frame is rotated by a small electromotor 10 with the aid of a rope or belt 11.

In the construction shown in Figs. 1 and 2, the shaft 4 is rotatable in both directions by means of a crank 12, which can be fixed in both of its end positions, so that the supporting frame 1, rigidly connected with the shaft 4, together with the incubator trays 2 can be inclined toward either side at about 40 degrees, as shown in Fig. 2.

In Fig. 3 the reference numerals correspond to those used in Figs. 1 and 2 with the exception that the same are primed.

I claim:—

1. In an electrically heated incubator the combination with incubator trays disposed in the incubator case, of an electric heating member arranged for rotation around the said trays.

2. In an electrically heated incubator the combination with incubator trays disposed in the incubator case, of an electric heating member arranged for rotation around the said trays, and means for continuously rotating the said heating member.

3. In an electrically heated incubator the combination with incubator trays disposed in the incubator case, of an electric heating member mounted on a support rotating around the said trays, moisture absorbing means mounted on the said support, and a liquid receptacle in the incubator case into which dips the said means during a part of its rotation round the said trays.

4. In an electrically heated incubator the combination with incubator trays disposed in the incubator case, of an electric heating member mounted on a support rotating around the said trays, means for continuously rotating the said heating member, moisture absorbing means mounted on the said support, and a liquid receptacle in the incubator case into which dips the said means during a part of its rotation round the said trays.

In testimony whereof I affix my signature.

ADOLF NICKERL.